United States Patent
Mogami

(10) Patent No.: US 11,176,702 B2
(45) Date of Patent: Nov. 16, 2021

(54) 3D IMAGE RECONSTRUCTION PROCESSING APPARATUS, 3D IMAGE RECONSTRUCTION PROCESSING METHOD AND COMPUTER-READABLE STORAGE MEDIUM STORING 3D IMAGE RECONSTRUCTION PROCESSING PROGRAM

(71) Applicant: OLYMPUS CORPORATION, Tokyo (JP)

(72) Inventor: Kota Mogami, Mitaka (JP)

(73) Assignee: OLYMPUS CORPORATION, Tokyo (JP)

(*) Notice: Subject to any disclaimer, the term of this patent is extended or adjusted under 35 U.S.C. 154(b) by 70 days.

(21) Appl. No.: 16/746,006

(22) Filed: Jan. 17, 2020

(65) Prior Publication Data

US 2020/0202563 A1    Jun. 25, 2020

Related U.S. Application Data

(63) Continuation of application No. PCT/JP2017/034141, filed on Sep. 21, 2017.

(51) Int. Cl.
  *G06T 7/73* (2017.01)
  *G06T 7/55* (2017.01)

(52) U.S. Cl.
  CPC ............ *G06T 7/74* (2017.01); *G06T 7/55* (2017.01); *G06T 2207/10068* (2013.01); *G06T 2207/30244* (2013.01)

(58) Field of Classification Search
  CPC .. G06T 7/30; G06T 7/33; G06T 7/337; G06T 7/38; G06T 7/55; G06T 7/579;
  (Continued)

(56) References Cited

U.S. PATENT DOCUMENTS

| 9,460,513 B1* | 10/2016 | Ramalingam et al. ... G06T 7/33 |
| 2009/0268214 A1* | 10/2009 | Lucic et al. .............. G06T 7/73 |
| | | 356/614 |
| 2021/0110599 A1* | 4/2021 | Fang et al. .............. G06F 17/16 |

FOREIGN PATENT DOCUMENTS

| JP | 2004-334819 A | 11/2004 |
| JP | 2009-014628 A | 1/2009 |
| JP | 2015-111822 A | 6/2015 |

OTHER PUBLICATIONS

International Search Report dated Dec. 5, 2017 issued in PCT/JP2017/034141.

(Continued)

*Primary Examiner* — Andrew W Johns
(74) *Attorney, Agent, or Firm* — Scully, Scott, Murphy & Presser, P.C.

(57) ABSTRACT

A 3D image reconstruction processing apparatus includes a processor. The processor acquires a plurality of images captured at different viewpoints. The processor selects two images from the acquired images as an image pair. The processor calculates a relative pose between the two images which constitute each of the selected image pairs. The processor judges whether or not the relative pose between the two images which constitute the selected image pair is capable of being uniquely calculated. The processor determines, based on a result of the judgment, the relative pose which is used in calculating an initial value of bundle adjustment. The processor performs the bundle adjustment, based on the initial value of the bundle adjustment calculated based on the determined relative pose.

11 Claims, 8 Drawing Sheets

(58) Field of Classification Search
CPC .. G06T 7/593; G06T 7/70; G06T 7/73; G06T 7/74; G06T 7/97; G06T 2200/08; G06T 2207/30244; G06K 2209/40; H04N 2013/0074; H04N 13/111; H04N 13/264
See application file for complete search history.

(56) References Cited

OTHER PUBLICATIONS

Nister, David, "An Efficient Solution to the Five-Point Relative Pose Problem," TPAMI (2004), cited in spec on pp. 2 and 17.
Schoenberger, Johannes L., "Structure-from-Motion Revisited," CVPR (2016), cited in spec on p. 2.
Martinec, Daniel et al., "Robust Rotation and Translation Estimation in Multiview Reconstruction," CVPR (2007), cited in spec on p. 2.
English translation of International Preliminary Report on Patentability dated Mar. 24, 2020, together with the Written Opinion received in related International Application No. PCT/JP2017/034141.

\* cited by examiner

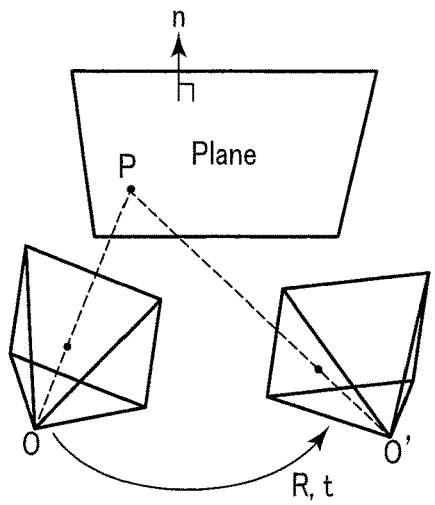
F I G. 5
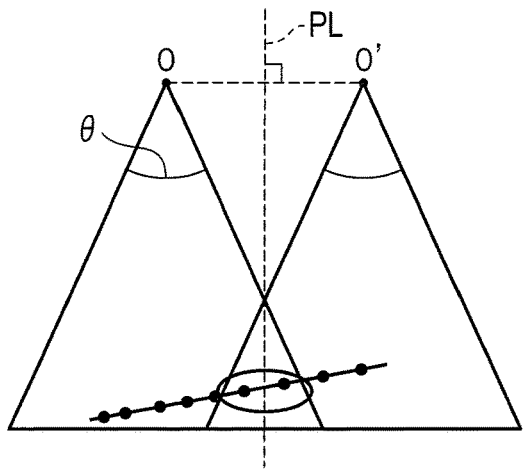
F I G. 6A
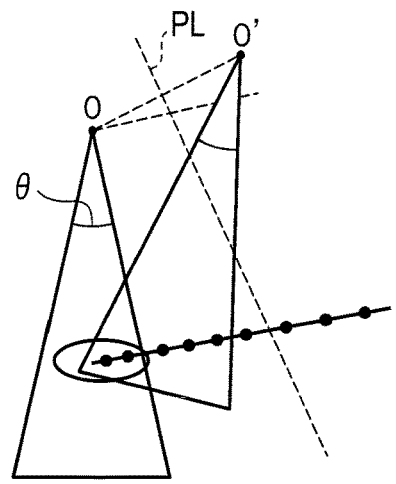
F I G. 6B

3D IMAGE RECONSTRUCTION PROCESSING APPARATUS, 3D IMAGE RECONSTRUCTION PROCESSING METHOD AND COMPUTER-READABLE STORAGE MEDIUM STORING 3D IMAGE RECONSTRUCTION PROCESSING PROGRAM

CROSS-REFERENCE TO RELATED APPLICATIONS

This application is a Continuation Application of PCT Application No. PCT/JP2017/034141, filed Sep. 21, 2017, the entire contents of which are incorporated herein by reference.

FIELD

Embodiments relate to a 3D image reconstruction processing apparatus which restores a 3D shape of a subject from a plurality of images acquired by imaging the subject from a plurality of different viewpoints, a 3D image reconstruction processing method, and a computer-readable storage medium storing a 3D image reconstruction processing program.

BACKGROUND

There is known a technology called "SfM" (Structure from Motion), which restores, from a plurality of images acquired by imaging a subject from a plurality of different viewpoints, a pose of an imaging unit which captured the images and a 3D shape of the subject. In the SfM, from coordinates of common feature points of the subject in the images, 3D coordinates of feature points matching with coordinates of observed feature points, and the pose of the imaging unit which captured the images, are calculated by a technology called "bundle adjustment". As a technology relating to SfM, there are known technologies disclosed in Jpn. Pat. Appln. KOKAI Publication No. 2015-111822, D. Nister, "An Efficient Solution to the Five-Point Relative Pose Problem," TPAMI (2004), J. L. Schonberger, and J.-M. Frahm, "Structure-from-Motion Revisited," CVPR (2016), and D. Martinec and T. Pajdla, "Robust Rotation and Translation Estimation in Multiview Reconstruction," CVPR (2007).

In the bundle adjustment, 3D coordinates of feature points and the pose of the imaging unit are estimated so as to decrease a cost function which increases in accordance with a magnitude of a difference between coordinates, at which feature points appear on an image when feature points existing at estimated 3D coordinates are imaged with a certain pose of the imaging unit, and coordinates on an image of actually observed feature points. The cost function is a nonlinear function relating to the 3D coordinates of feature points and the pose of the imaging unit, and it is difficult to analytically calculate a solution which minimizes the cost function. This being the case, a solution which minimizes the cost function is searched by a gradient method. However, in order to perform the gradient method, initial values are needed with respect to the 3D coordinates of feature points in a certain reference coordinate system and the pose of the imaging unit. The cost function has a complex shape, and, in order to perform high-precision 3D reconstruction, a process of the gradient method needs to be started from initial values which are sufficiently close to a correct solution.

As a method of calculating the initial value of the bundle adjustment, such a method is widely used that a plurality of relative poses, each of which is calculated between two images, are combined, and thereby the pose of the imaging unit in a reference coordinate system, which is a coordinate system common to all images, is calculated as an initial value. The relative pose between two images is calculated from coordinates of feature points which are associated between two images. An eight-point algorism, a five-point algorithm, and the like are known as algorithms for calculating the relative pose. The eight-point algorithm is an algorithm in which a fundamental matrix (F matrix) is calculated by using coordinates of eight pairs of feature points which are common to two images, and the relative pose is calculated from the F matrix. The five-point algorithm is an algorithm in which an essential matrix (E matrix) is calculated by using coordinates of five pairs of feature points which are common to two images, and intrinsic parameters representative of characteristics of the imaging unit, and the relative pose is calculated from the E matrix.

SUMMARY

According to a first aspect, a 3D image reconstruction processing apparatus comprises a processor configured to: acquire a plurality of images captured at different viewpoints; select two images from the acquired images as an image pair; calculate a relative pose between the two images which constitute each of the selected image pairs; judge whether or not the relative pose between the two images which constitute the selected image pair is capable of being uniquely calculated; determine, based on a result of the judgment, the relative pose which is used in calculating an initial value of bundle adjustment; and perform the bundle adjustment, based on the initial value of the bundle adjustment calculated based on the determined relative pose.

According to a second aspect, a 3D image reconstruction processing method comprising: acquiring a plurality of images captured at different viewpoints; selecting two images from the acquired images as an image pair; calculating a relative pose between the two images which constitute each of the selected image pairs; judging whether or not the relative pose between the two images which constitute the selected image pair is capable of being uniquely calculated; determining, based on a result of the judging, the relative pose which is used in calculating an initial value of bundle adjustment; and performing the bundle adjustment, based on the initial value of the bundle adjustment calculated based on the determined relative pose.

According to a third aspect, a non-transitory computer-readable storage medium storing a 3D image reconstruction processing program for causing a computer to execute: acquiring a plurality of images captured at different viewpoints; selecting two images from the acquired images as an image pair; calculating a relative pose between the two images which constitute each of the selected image pairs; judging whether or not the relative pose between the two images which constitute the selected image pair is capable of being uniquely calculated; determining, based on a result of the judging, the relative pose which is used in calculating an initial value of bundle adjustment; and performing the bundle adjustment, based on the initial value of the bundle adjustment calculated based on the determined relative pose.

Advantages of the embodiments will be set forth in the description which follows, and in part will be obvious from the description, or may be learned. The advantages may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate embodiments, and together with the general description given above and the detailed description of the embodiments given below, serve to explain the principles.

FIG. 5 is a view illustrating a concept of a transformation matrix;

FIG. 6A is a view illustrating a relationship between an imaging unit and two images at a time when a relative pose can uniquely be calculated;

FIG. 6B is a view illustrating a relationship between an imaging unit and two images at a time when a relative pose cannot uniquely be calculated;

DETAILED DESCRIPTION

Hereinafter, embodiments will be described with reference to the accompanying drawings.

First Embodiment

Figure 1:
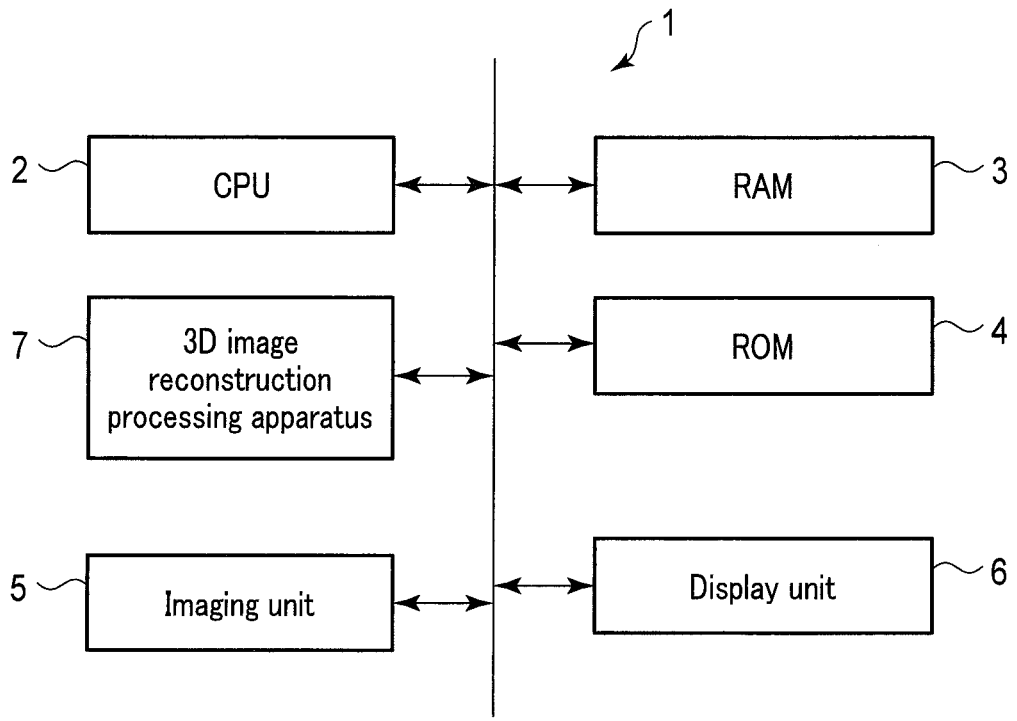
FIG. 1 is a block diagram illustrating a configuration of an imaging apparatus according to each of embodiments.

To begin with, a first embodiment will be described. FIG. 1 is a block diagram illustrating a configuration of an imaging apparatus according to each of embodiments. The imaging apparatus 1 illustrated in FIG. 1 includes a CPU 2, a RAM 3, a ROM 4, an imaging unit 5, a display unit 6, and a 3D image reconstruction processing apparatus 7. The imaging apparatus 1 is, for example, an endoscope apparatus including an imaging function. The imaging apparatus 1 may not be an endoscope apparatus, if the imaging apparatus 1 is an apparatus including an imaging function, such as a digital camera, a Webcam, a smartphone, an in-vehicle camera, or the like.

The CPU 2 is a control circuit which controls respective components of the imaging apparatus 1. The CPU 2 executes control according to programs stored in the ROM 4. For example, the CPU 2 controls the operation of an imaging operation by the imaging unit 5, and controls a display operation in the display unit 6. Further, the CPU 2 inputs intrinsic parameters, which indicate characteristics of the imaging unit 5, to the 3D image reconstruction processing apparatus 7. The intrinsic parameters include a focal distance of an optical system of the imaging unit 5, and coordinates of an image center, which are coordinates at which an optical axis of the optical system intersects with an imaging surface of an imaging element. In FIG. 1, although the control circuit of the imaging apparatus 1 is the CPU, the control circuit may be composed of an ASIC, FPGA, or the like.

The RAM 3 temporarily stores various data such as data calculated in the CPU 2, images acquired by the imaging unit 5, and processing results in the 3D image reconstruction processing apparatus 7. The RAM 3 is composed of, for example, a volatile memory such as a DRAM or an SDRAM.

The ROM 4 stores various data such as programs that are executed by the CPU 2, and intrinsic parameters. The ROM 4 is composed of a nonvolatile memory such as a flash ROM. The ROM 4 may be replaced with some other storage medium such as a hard disk drive (HDD) or a solid state drive (SSD).

The imaging unit 5 includes an optical system and an imaging element, and acquires images relating to a subject (not shown) by imaging the subject. The optical system forms an image of a subject (not shown) on an imaging surface of the imaging element. The optical system may include a focus lens, a zoom lens, etc. The imaging element is, for example, a CMOS image sensor, and converts the image of the subject, which is formed on the imaging surface, to an image signal (hereinafter, simply referred to as "image") which is an electrical signal. The image generated by the imaging element is stored, for example, in the RAM 3.

The display unit 6 displays various images such as images acquired by the imaging unit 5. The display unit 6 is a liquid crystal display, an organic EL display, etc.

Figure 2:
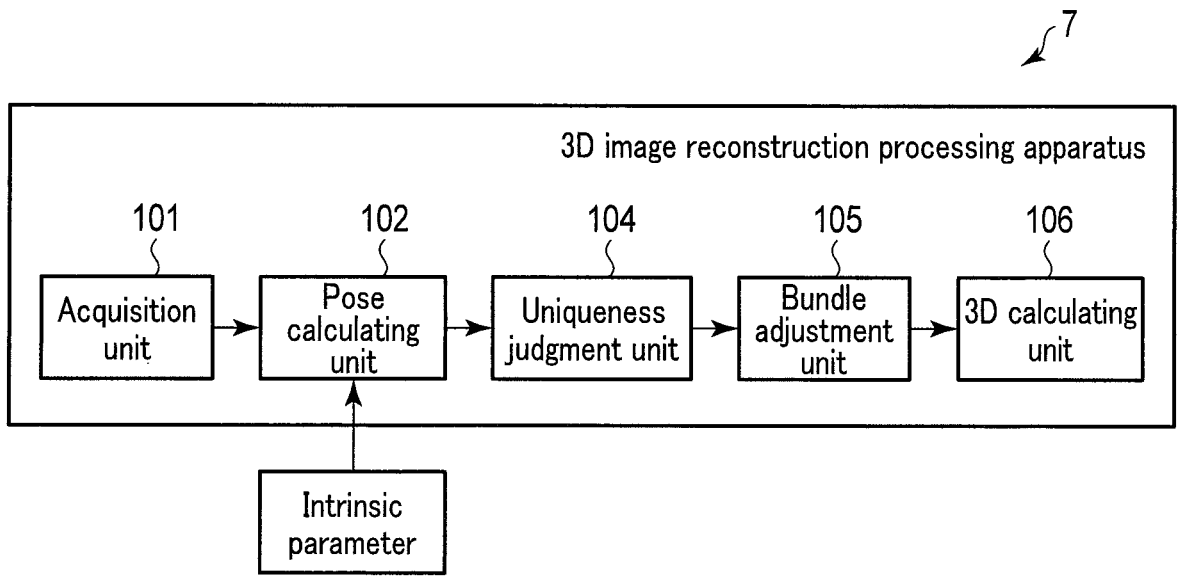
FIG. 2 is a block diagram illustrating a configuration of a 3D image reconstruction processing apparatus in a first embodiment.

The 3D image reconstruction processing apparatus 7 executes, for example, a process of restoring a 3D shape of the subject from the images acquired by the imaging unit 5. The 3D image reconstruction processing apparatus 7 is composed of, for example, a processor such as a DSP. Hereinafter, the 3D image reconstruction processing apparatus 7 will further be described with reference to FIG. 2. FIG. 2 is a block diagram illustrating a configuration of the 3D image reconstruction processing apparatus 7 in the first embodiment. As illustrated in FIG. 2, the 3D image reconstruction processing apparatus 7 includes an acquisition unit 101, a pose calculating unit 102, a uniqueness judgment unit 104, a bundle adjustment unit 105, and a 3D calculating unit 106. The functions of these blocks are realized by, for example, a software process. Needless to say, the acquisition unit 101, pose calculating unit 102, uniqueness judgment unit 104, bundle adjustment unit 105 and 3D calculating unit 106 may also be composed of hardware.

The acquisition unit 101 acquires images of a plurality of viewpoints. Then, the acquisition unit 101 inputs the acquired images to the pose calculating unit 102. The images of the plural viewpoints acquired by the acquisition unit 101 may be, for example, a movie image acquired by continuously imaging an identical subject while varying the pose of the imaging unit 5, or may be a plurality of individual still images acquired by imaging an identical subject multiple times while varying the pose of the imaging unit 5. In addition, the acquisition unit 101 is not limited to a unit which directly acquires images from the imaging unit 5. For example, when already captured images are stored in a storage device (e.g. ROM 4) in the inside of the imaging apparatus 1 or in a storage device outside the imaging apparatus 1, the acquisition unit 101 may acquire the already captured images from the storage device. In the case of this configuration, the 3D image reconstruction processing apparatus 7 may not necessarily be mounted in the imaging apparatus 1, and may be, for example, a personal computer or the like, which is communicably connected to the imaging apparatus 1 and is used.

The pose calculating unit 102 selects, as an image pair, two images among the images which are input from the acquisition unit 101, and repeatedly calculates a relative pose which represents a change between the pose of the imaging unit 5 at a time when a first image that constitutes the selected image pair was captured and the pose of the imaging unit 5 at a time when a second image that constitutes the selected image pair was captured. Although details will be described later, in the present embodiment, the relative pose is calculated by a five-point algorithm. The five-point algorithm is an algorithm in which an essential matrix (E matrix) is calculated by using coordinates of five pairs of feature points (corresponding feature points) which are common to the two images, and intrinsic parameters, and the relative pose is calculated from the E matrix. As described above, the intrinsic parameters include the focal distance of the optical system of the imaging unit 5, and the coordinates of an image center. The coordinates of the image center are coordinates at which the optical axis of the optical system intersects with the imaging surface of the imaging element.

The uniqueness judgment unit 104 judges whether the relative pose can uniquely be specified by the image pair selected by the pose calculating unit 102, from the distribution of feature points included in the two images constituting the image pair selected by the pose calculating unit 102, and from the relative pose. Although details will be described later, when the subject is a plane, there is a case in which the relative pose cannot uniquely be specified, depending on the manner of selection of the image pair. The uniqueness judgment unit 104 performs, with respect to each of image pairs, judgment as to whether the relative pose can uniquely be specified. Then, the uniqueness judgment unit 104 sends to the bundle adjustment unit 105 the information indicative of whether the relative pose can uniquely be specified or not, together with the relative pose calculated by the pose calculating unit 102.

The bundle adjustment unit 105 performs bundle adjustment for estimating the 3D coordinates of feature points in the images and the pose of the imaging unit 5, by using the relative pose calculated by the pose calculating unit 102 with respect to each of the image pairs. At this time, the bundle adjustment unit 105 makes use of the relative pose, which is calculated from the image pair that is judged to be capable of uniquely specifying the relative pose by the uniqueness judgment unit 104, in order to calculate an initial value of bundle adjustment, and does not make use of the relative pose, which is calculated from the image pair that is judged to be incapable of uniquely specifying the relative pose, in order to calculate an initial value of bundle adjustment. The details of the bundle adjustment will be described later.

The 3D calculating unit 106 calculates 3D coordinates of all points in the image (the 3D shape of the subject) from the 3D coordinates of feature points and the camera pose of the imaging unit 5, which are calculated by the bundle adjustment unit 105.

Figure 3:
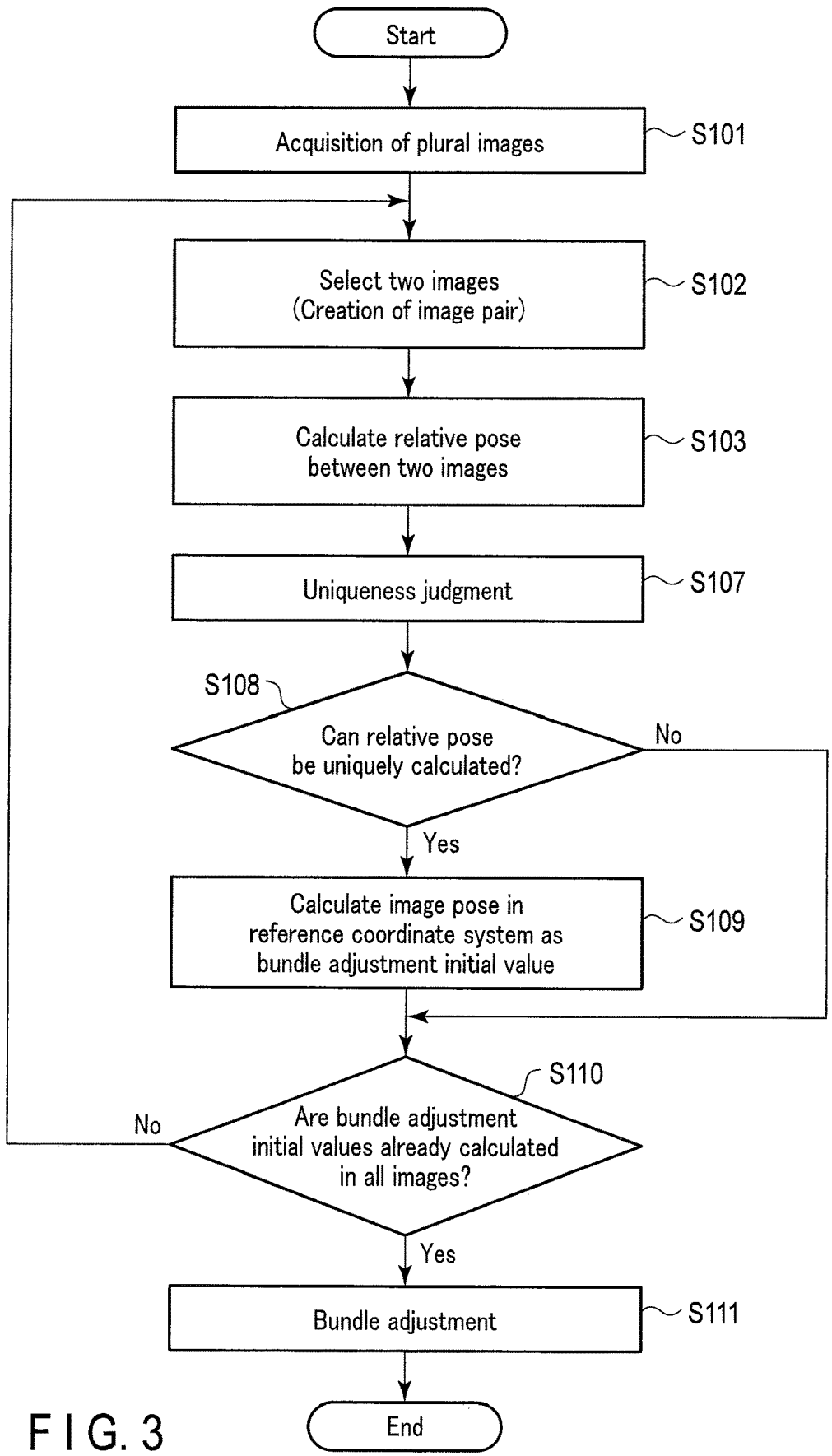
FIG. 3 is a flowchart illustrating an operation of the 3D image reconstruction processing apparatus in the first embodiment.

Next, an operation of the 3D image reconstruction processing apparatus 7 will be described. FIG. 3 is a flowchart illustrating the operation of the 3D image reconstruction processing apparatus 7 in the first embodiment.

In step S101, the acquisition unit 101 acquires, for example, a plurality of images which are captured by the imaging unit 5 and stored in the RAM 3. The acquisition unit 101 inputs the acquired images to the pose calculating unit 102. As described above, the images acquired by the acquisition unit 101 may be, for example, a movie image acquired by continuously imaging an identical subject while varying the pose of the imaging unit 5, or may be a plurality of temporally discontinuous still images acquired by imaging an identical subject multiple times while varying the pose of the imaging unit 5.

In step S102, the pose calculating unit 102 selects, as an image pair, two images among the input images. It should suffice if the combination of two images selected as the image pair is different from combinations of other image pairs. However, a combination in which two images are considered to have no correlation (a combination with high possibility of the absence of corresponding feature points between two images) may be excluded from the selection.

Figure 4:
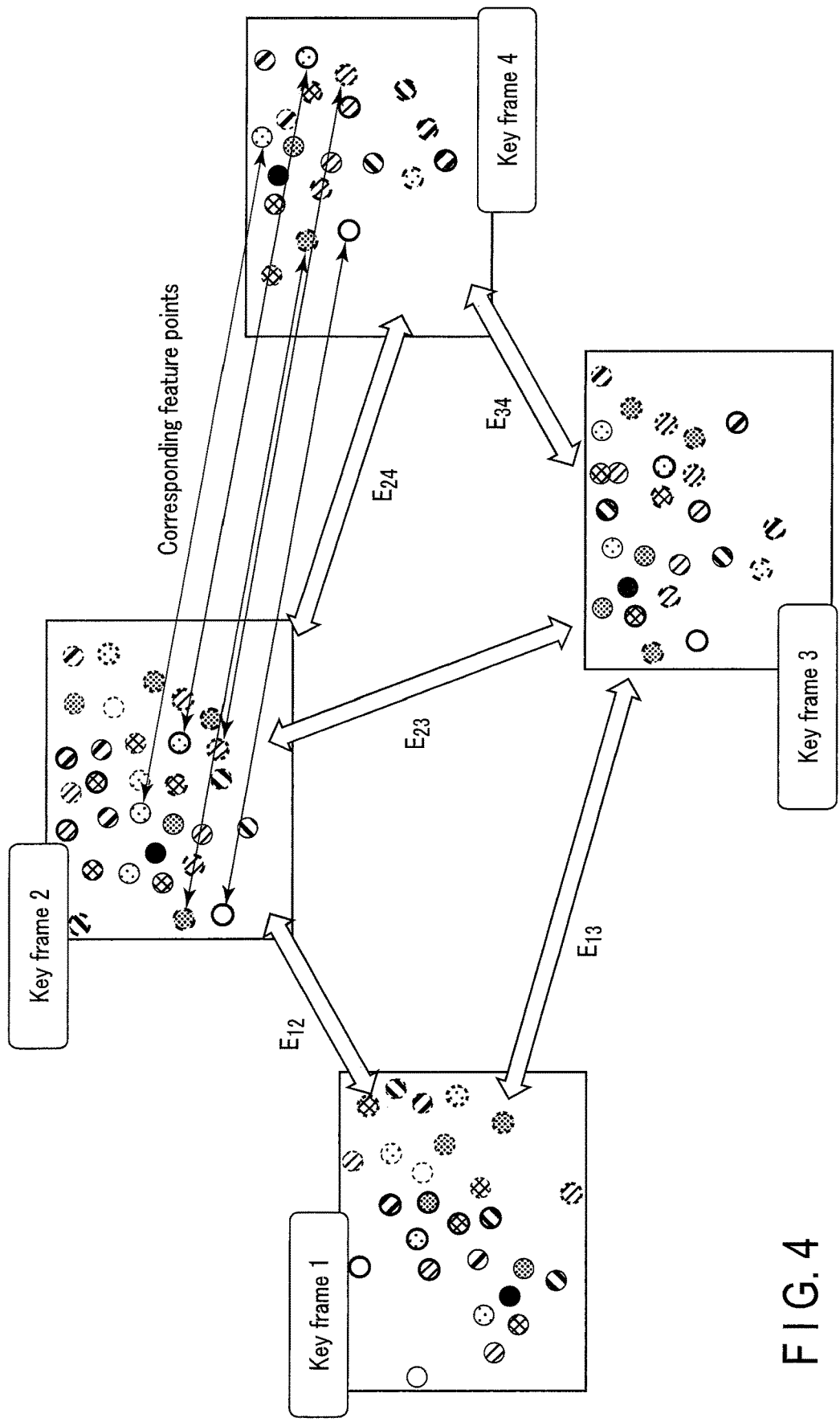
FIG. 4 is a view illustrating a selection example of an image pair.

Referring to FIG. 4, a selection example of the image pair will be described. In FIG. 4, four images, namely a key frame 1, a key frame 2, a key frame 3 and a key frame 4, are input to the pose calculating unit 102 as images. The key frames 1, 2, 3 and 4 are images captured in the named order. The number of combinations of image pairs in the case of four images is six, i.e. a combination of key frames 1 and 2, a combination of key frames 1 and 3, a combination of key frames 1 and 4, a combination of key frames 2 and 3, a combination of key frames 2 and 4, and a combination of key frames 3 and 4. However, since a time difference between the key frame 1 and key frame 4 is large, the combination of key frames 1 and 4 may be excluded from the selection of image pairs.

In step S103, the pose calculating unit 102 calculates a relative pose between two images from coordinates of corresponding feature points between the two images. Hereinafter, a process of step S103 will be described. In the present embodiment, a transformation matrix, which represents a change of the coordinate system of the imaging unit 5 that captured two images, is calculated as the relative pose. FIG. 5 is a view illustrating a concept of the transformation matrix. As illustrated in FIG. 5, a transformation matrix relating to an image pair, which includes an image acquired when imaging an arbitrary point p of a subject by the imaging unit 5 from coordinates O and an image acquired when imaging the arbitrary point p of the subject by the imaging unit 5 from coordinates O', is a matrix for converting a coordinate system of the image captured at the coordinates O to a coordinate system of the image captured at the coordinates O'. This transformation matrix represents a 3×3 rotation matrix R representative of the rotation of the coordinate system of the imaging unit 5 and a translation vector t that is a 3D vector representative of translational movement of the coordinate system of the imaging unit 5.

As a method of calculating the transformation matrix, there are known an eight-point algorithm, a five-point algorithm and the like, in which an equation is solved by a linear solution from the coordinates of feature points (corresponding feature points) corresponding between two images. However, when a subject is a plane, the solution cannot be solved by the eight-point algorithm since the number of independent equations is less than the number of unknowns. Thus, in this embodiment, use is made of the five-point algorithm which is a method by which a relative pose between two images can be calculated even when the subject is a plane. The five-point algorithm is a method which can be used when a focal distance f of the optical system of the imaging unit 5, which is an intrinsic parameter, and coordinates $a=(a,b)^T$ of an image center, which are coordinates where the optical axis of the optical system intersects with the imaging surface of the imaging element, are known. In this five-point algorithm, by solving nonlinear equations created from the coordinates of five pairs of corresponding feature points, a transformation matrix representing the relative pose between two images is calculated. In the five-point algorithm, a 3×3 rotation matrix called "E matrix", which is determined by a relative pose between two images, is calculated, and a transformation matrix is calculated by subjecting the E matrix to singular value decomposition. Note that in FIG. 4, an E matrix calculated from the combination of key frames 1 and 2 is indicated by $E_{12}$, an E matrix calculated from the combination of key frames 1 and 3 is indicated by $E_{13}$, an E matrix calculated from the combination of key frames 2 and 3 is indicated by $E_{23}$, an E matrix calculated from the combination of key frames 2 and 4 is indicated by $E_{24}$, and an E matrix calculated from the combination of key frames 3 and 4 is indicated by $E_{34}$.

When the images acquired by the acquisition unit 101 are a movie image, the coordinates of corresponding feature points can be extracted by tracking, on a frame-by-frame basis, feature points which are extracted in a certain frame in the movie image and which can easily be tracked. As the method of extracting feature points in an image, methods such as FAST corner detection and Harris corner detection are known. In addition, as the method of tracking feature points in a movie image, a block matching method, a Lukas-Kanade method and the like are known. Besides, when the images acquired by the acquisition unit 101 are not temporally continuous images, the coordinates of corresponding feature points can be extracted by acquiring, on an image-by-image basis, feature points which can easily be associated, and by comparing, on an image-by-image basis, the similarity between the acquired feature points. As the feature points which can easily be associated, for example, SIFT (Scale-Invariant Feature Transform) and SURF (Speeded Up Robust Features) are well known. Note that the corresponding feature points may not only automatically be extracted, but may also be extracted by a method in which a user designates corresponding points of images one by one.

Here, in the method of calculating the relative pose between images by solving equations created from the coordinates of corresponding feature points as in the five-point algorithm, there is a case in which a small error of coordinates of corresponding feature points leads to a large error of the calculated relative pose. Thus, in the present embodiment, when the relative pose is calculated, robust estimation such as RANSAC (RANdom SAmple Consensus) and LMedS (Least Median of Squares), i.e. a process of solving equations by extracting, from the corresponding feature points, only minimum necessary corresponding feature points for creating equations, is repeated, and a process of adopting a relative pose, which most appropriately describes the coordinates of all corresponding feature points, is performed. For example, in RANSAC, a relative pose with a least number of feature points having errors not greater than a threshold is adopted. In addition, In LMedS, a relative pose with a least median of the square of errors is adopted. As the errors, for example, Sampson errors are used.

Here, the description returns to that of FIG. 3. In step S107 after the calculation of the relative pose, the uniqueness judgment unit 104 performs uniqueness judgment for judging whether or not the relative pose between the two images selected as the image pair can uniquely be calculated. Hereinafter, the uniqueness judgment of step S107 will be described.

D. Nister, "An Efficient Solution to the Five-Point Relative Pose Problem," TPAMI (2004) discloses that when a subject is a plane, the relative pose cannot uniquely be calculated "if all points on images are close to a viewpoint position at which one image was captured". Specifically, if both a feature point close to the optical center of the imaging unit 5, which captured the first image of the two images constituting the image pair, and a feature point close to the optical center of the optical system of the imaging unit 5, which captured the second image of the two images, appear on both of the two images, and if these feature points are corresponding feature points, the relative pose can uniquely be calculated even when the subject is a plane. This state, as illustrated in FIG. 6A, can also be expressed as a state in which when the viewpoint of the imaging unit 5 shifts from coordinates O to coordinates O', corresponding feature points are present on both sides of a vertical bisector plane PL of OO'. On the other hand, when all corresponding feature points are close to only one of the optical center of the optical system of the imaging unit 5, which captured the first image, and the optical center of the optical system of the imaging unit 5, which captured the second image, the relative pose cannot uniquely be calculated. This state, as illustrated in FIG. 6B, can also be expressed as a state in which when the viewpoint of the imaging unit 5 shifts from coordinates O to coordinates O', corresponding feature points are present on only one side of a vertical bisector plane PL of OO'.

As illustrated also in FIG. 5, when the subject is the plane, there is a relationship of projective transformation between the corresponding feature points of the two images. A transformation matrix H that represents the projective transformation can be calculated from a normal vector n of the plane, distance d to the plane, a rotation matrix R from the coordinate system of the image captured at the coordinates O to the coordinate system of the image captured at the coordinates O', and a translation vector t.

Here, if R, t, d and n are calculated from H, four solutions {R, t, d, n}, which are correct in mathematical expressions, are calculated. Among pose changes expressed by the four solutions, the actual pose change is a pose change in which the subject (feature point) is present in front of the imaging unit 5. Thus, the relative pose can uniquely be determined when the four solutions have the relations below. In the states of (Solution 2) and (Solution 3), a feature point existing in front of the imaging unit 5 and a feature point existing behind the imaging unit 5 are separated at a boundary of the vertical bisector plane PL of OO' illustrated in FIG. 6A.

(Solution 1): All feature points exist in front of the imaging unit 5.

(Solution 2), (Solution 3): Some feature points exist in front of the imaging unit 5, and other feature points exist behind the imaging unit 5.

(Solution 4): All feature points exist behind the imaging unit 5.

On the other hand, when the four solutions have the relations below, the relative pose cannot uniquely be determined. This corresponds to the case in which there is only the state illustrated in FIG. 6B. In this case, whether (Solution 1) or (Solution 2) represents the actual pose change cannot be specified by numerical expressions alone.

(Solution 1), (Solution 2): All feature points exist in front of the imaging unit 5.

(Solution 3), (Solution 4): All feature points exist behind the imaging unit 5.

From this principle, the following can be understood. If both the feature point close to the optical center of the imaging unit 5, which captured the first image of the two images constituting the image pair, and the feature point close to the optical center of the optical system of the imaging unit 5, which captured the second image of the two images, appear on both of the two images, and if these feature points are corresponding feature points, the relative pose can uniquely be calculated even when the subject is a plane, and, in other cases, the relative pose cannot uniquely be calculated.

Hereinafter, a concrete example of the uniqueness judgment will be described. To begin with, from the relative pose between two images, which is calculated by the pose calculating unit 102, and from the 3D coordinates of feature points calculated by using this relative pose, the uniqueness judgment unit 104 calculates a number n1 of feature points having a close 3D distance to the optical center at a time when the first image of the two images was captured, and a number n2 of feature points having a close 3D distance to the optical center at a time when the second image was captured. Then, the uniqueness judgment unit 104 judges that the pose change can uniquely be calculated when min(n1,n2)/max(n1,n2) is a threshold or more, i.e. when a difference between n1 and n2 is small. Here, min(n1,n2) is a smaller value between n1 and n2, and max(n1,n2) is a greater value between n1 and n2.

As the method of calculating 3D coordinates of feature points at the time of the uniqueness judgment, when the relative pose between two images and the coordinates of corresponding feature points on the images are already known, a DLT (Direct Linear Transformation) method or a midpoint method can be used. In the DLT method, when the 3D coordinates of feature points that are based on the coordinate system of the first image is a 3D vector X, the 3D coordinates of feature points that are based on the coordinate system of the second image is a 3D vector X', the coordinates of feature points in the first image and second image are 2D vectors $x'_1$ and $x'_2$, the focal distance of the optical system of the imaging unit 5 that images the subject is f, and the coordinates of the image center is a 2D vector a, and when X'=RX+t can be expressed by using a 3×3 orthogonal matrix R in which a determinant is 1, and a 3D vector t, a 3D vector X representative of the 3D coordinates of feature points is calculated so as to meet conditional expressions (equation 1) and (equation 2) below:

$$z_1 \times X_1 = 0 \quad \text{(equation 1)}$$

$$z_2 \times X_2 = 0 \quad \text{(equation 2)}$$

where $X_1$ is the 3D vector X, and $X_2$ is the 3D vector RX+t. In addition, $z_1$ is a 3D vector in which the first element of the 2D vector $x_1$ is a first element, the second element of $x_1$ is a second element, and a third element is 1. Besides, $z_2$ is a 3D vector in which the first element of the 2D vector $x_2$ is a first element, the second element of $x_2$ is a second element, and a third element is 1. Further, 0 is a zero vector. The 2D vectors $x_1$ and $x_2$ are expressed as follows:

$$x_1 = \frac{1}{f}(x'_1 - a)$$

$$x_2 = \frac{1}{f}(x'_2 - a)$$

Hereinafter, a more concrete description will be given. When the 3D vector X is $X = (X\ Y\ Z)^T$, the left side of $z_j \times X_j = 0$ (j=1,2) of (equation 1) and (equation 2) becomes a 3D vector. In addition, the elements of the 3D vector, which is expressed by $z_j \times X_j$, have linear terms and constant terms relating to X, Y and Z. Thus, $z_j \times X_j$ can be rewritten like (equation 3) below:

$$z_j \times X_j = \begin{pmatrix} a_{j,11} & a_{j,12} & a_{j,13} & a_{j,14} \\ a_{j,21} & a_{j,22} & a_{j,23} & a_{j,24} \\ a_{j,31} & a_{j,32} & a_{j,33} & a_{j,34} \end{pmatrix} \begin{pmatrix} X \\ Y \\ Z \\ 1 \end{pmatrix} \quad \text{(equation 3)}$$

(The respective components of the 4×3 matrix of the right side of (equation 3) are constants calculated by using the respective components of R, t, $x_j$.)

From (equation 1) and (equation 2), the vector rewritten by (equation 3) is equal to zero vector 0. Thus, a matrix A expressed by (equation 4) below is defined:

$$A = \begin{pmatrix} a_{1,11} & a_{1,12} & a_{1,13} & a_{1,14} \\ a_{1,21} & a_{1,22} & a_{1,23} & a_{1,24} \\ a_{2,11} & a_{2,12} & a_{2,13} & a_{2,14} \\ a_{2,21} & a_{2,22} & a_{2,23} & a_{2,24} \end{pmatrix} \quad \text{(equation 4)}$$

At this time, a relationship of (equation 5) below is established:

$$A \begin{pmatrix} X \\ Y \\ Z \\ 1 \end{pmatrix} = 0 \quad \text{(equation 5)}$$

As indicated by (equation 5), $(X\ Y\ Z\ 1)^T$ should become a null-space of 4×4 matrix A. Actually, when $x'_1$ and $x'_2$ include an error, a null-space does not necessarily exist in the matrix A. In this case, $(X\ Y\ Z\ 1)^T$ can be obtained by considering that a space created by a right singular vector for a least singular value of the matrix A to be a null-space of the matrix A, and by performing normalization such that a fourth component of the right singular vector for the least singular value becomes 1.

When a point existing at X in the coordinate system of the first image can be expressed as RX+t in the coordinate system of the second image, the coordinates $O_1$ of the optical center in the first image and the coordinates $O_2$ of the optical center in the second image are expressed $O_1=0$, and $O_2=-R^T t$, respectively, in the coordinate system of the first image. From this relationship, by calculating the distances between the 3D coordinates X of all feature points in the coordinate system of the first image and the coordinates $O_1$ and coordinates $O_2$ of the optical centers, the numbers n1 and n2 of feature points can be calculated. From the numbers n1 and n2 of feature points, the uniqueness judgment is performed as described above.

Here, the description returns to that of FIG. 3. In step S108 after the uniqueness judgment, the bundle adjustment unit 105 determines whether or not it is judged that the relative pose between the two images selected as the image pair can uniquely be calculated. When it is judged in step S108 that the relative pose between the two images selected as the image pair can uniquely be calculated, the process goes to step S109. When it is judged in step S108 that the relative pose between the two images selected as the image pair cannot uniquely be calculated, the process goes to step S110. Specifically, in the present embodiment, when it is judged that the relative pose between the two images selected as the image pair cannot uniquely be calculated, the calculation of initial values, which will be described in step S109, is not performed.

In step S109, the bundle adjustment unit 105 calculates an image pose in the reference coordinate system as the initial values of bundle adjustment, by using the relative pose between the two images selected as the image pair. Hereinafter, an example of the calculation method of initial values will be described.

The image pose in the reference coordinate system, which is set as initial values, includes an initial value $R_j^0$ of the rotation matrix which represents the rotation of an image j relative to the reference coordinate system, and a translation vector $t_j^0$ which represents the translation movement of the image j relative to the reference coordinate system. In order to calculate these, for example, a Jbase-th coordinate system is first selected as a reference coordinate image. An initial value $R_{Jbase}^0$ of the rotation matrix of the reference coordinate image, and an initial value $t_{Jbase}^0$ of the translation vector are set as described below. $R_j^0$ is calculated as the rotation matrix of the image j relative to $R_{Jbase}^0$, and $t_j^0$ is calculated as the translation vector of the image j relative to $t_{Jbase}^0$.

$$R_{Jbase}^0 = \begin{pmatrix} 1 & 0 & 0 \\ 0 & 1 & 0 \\ 0 & 0 & 1 \end{pmatrix}, t_{Jbase}^0 = \begin{pmatrix} 0 \\ 0 \\ 0 \end{pmatrix}$$

Note that when the image pose in the reference coordinate system of an image J, whose pose in the reference coordinate system is already known, is $R_J^0$, $t_J^0$, and the relative pose of the image j relative to the image J is $R_{J,j}$, $t_{J,j}$ (i.e. when a relationship of $P'_{i,j} = R_{J,j}^T(P'_{i,J} - t_{J,j})$ exists between 3D coordinates $P'_{i,j}$ of a feature point i in the image j and 3D coordinates $P'_{i,J}$ of the feature point i in the image J), a pose $R_j^0$, $t_j^0$ of the image j in the reference coordinate system is calculated by $R_j^0 = R_{J,j} R_J^{0T}$, $t_j^0 = R_j^0 t_{J,j} + t_J^0$, respectively.

An initial value $P_i^0$ of the 3D coordinates of the feature point relative to the reference coordinate system is calculated by using, for example, a DLT method which is similar to the DLT method used when the 3D coordinates of the feature point is calculated from the relative pose between the two images in the above-described uniqueness judgment. It is assumed that the number of images, with which the relative coordinates to the reference coordinate system are calculated, is M; 3D coordinates of an i-th feature point are $X_i = (X_i\ Y_i\ Z_i)^T$; coordinates in the image j are $x'_{ij}$; and 3D coordinates of the feature point i in the coordinate system of the image j are $X_{ij} = R_j^{0T}(X_i t_j^0)$. In addition, a 2D vector $x_{ij}$ below is defined from the focal distance f of the optical system and coordinates a of the image center:

$$x_{ij} = \frac{1}{f}(x'_{ij} - a)$$

If a 3D vector, in which the first element of the 2D vector $x_{ij}$ is a first element, the second element of the 2D vector $x_{ij}$ is a second element, and a third element is 1, is $z_{ij}$, there exists $a_{ij,kl}$ (k=1,2,3, l=1,2,3,4), which satisfies the relationship of (equation 6) below:

$$z_{ij} \times X_{ij} = \begin{pmatrix} a_{ij,11} & a_{ij,12} & a_{ij,13} & a_{ij,14} \\ a_{ij,21} & a_{ij,22} & a_{ij,23} & a_{ij,24} \\ a_{ij,31} & a_{ij,32} & a_{ij,33} & a_{ij,34} \end{pmatrix} \begin{pmatrix} X_i \\ Y_i \\ Z_i \\ 1 \end{pmatrix} \quad \text{(equation 6)}$$

In (equation 6), by using $a_{ij,kl}$ of k=1, 2, a matrix $A_i$ expressed by (equation 7) below is defined. In addition, $X_i$ that is calculated by finding $X_i$, $Y_i$, $Z_i$, which satisfy $A_i(X_i\ Y_i\ Z_i\ 1)^T=0$, is set to be a 3D coordinate initial value $P_i^0$ of the feature point i in the bundle adjustment.

$$A_i = \begin{pmatrix} a_{i1,11} & a_{i1,12} & a_{i1,13} & a_{i1,14} \\ a_{i1,21} & a_{i1,22} & a_{i1,23} & a_{i1,24} \\ \vdots & \vdots & \vdots & \vdots \\ a_{iM,11} & a_{iM,12} & a_{iM,13} & a_{iM,14} \\ a_{iM,21} & a_{iM,22} & a_{iM,23} & a_{iM,24} \end{pmatrix} \quad \text{(equation 7)}$$

Actually, $x'_{ij}, R_j^0, t_j^0$ ($1 \leq j \leq M$) include errors. Thus, a null-space does not necessarily exist in the matrix $A_i$. In this case, $(X_i\ Y_i\ Z_i)^T$ can be obtained by considering that a right singular vector for a least singular value to be a null-space, and by performing normalization such that a fourth component becomes 1.

Here, the description returns to that of FIG. 3. In step S110 after the calculation of initial values, the bundle adjustment unit 105 determines, with respect to all images, whether the image pose in the reference coordinate system was calculated as the initial values of the bundle adjustment. When it is determined in step S110 that the initial values for all images are not calculated, the process returns to step S102. In this case, the above-described calculation of the relative pose, the uniqueness judgment and the calculation of initial values are executed for another image pair. Then, when it is determined in step S110 that the initial values for all images are calculated, the process advances to step S111.

In step S111, the bundle adjustment unit 105 performs bundle adjustment, and calculates the 3D coordinates of all feature points and the pose of the imaging unit 5 at a time point when the images were captured. Here, the pose of the imaging unit 5 includes 3D coordinates of the optical center, the direction of the optical axis, and the rotational angle of the imaging element around the optical axis direction. Hereinafter, the bundle adjustment will be described.

The bundle adjustment is a process of calculating the 3D coordinates of feature points and the pose of the imaging unit, which well correspond to the coordinates of observed feature points on images. In the bundle adjustment, for example, the 3D coordinates of feature points and the pose of the imaging unit, which minimize a cost C expressed by (equation 8) below, are calculated:

$$C = \Sigma_i \Sigma_j \rho(q_{ij} - p_{ij}(P_i, R_j, t_j)) \quad \text{(equation 8)}$$

Accordingly, if the 3D coordinates of feature points, which minimize the cost C, are $P_I^m$, and the pose of the imaging unit is $R_J^m$, $t_J^m$, then $P_I^m$, $R_J^m$, $t_J^m$ are calculated by (equation 9) below:

$$P_j^m, R_j^m, t_j^m = \arg\min_{P_i, R_j, t_j} \sum_i \sum_j \rho(q_{ij} - p_{ij}(P_i, R_j, t_j)) \quad \text{(equation 9)}$$

Here, $P_i$ in (equation 9) is a 3D vector representing 3D coordinates of an i-th feature point (feature point i) in the reference coordinate system. $t_j$ is a translation vector representing coordinate transformation between the coordinate system of the imaging unit 5 at the time when a j-th image (image j) was captured, and the reference coordinate system. $R_j$ is a rotation matrix representing coordinate transformation between the coordinate system of the imaging unit 5 at the time when the j-th image (image j) was captured, and the reference coordinate system, the rotation matrix being a 3×3 orthogonal matrix in which the determinant is 1. At this time, 3D coordinates $P'_{ij}$ of the feature point i in the coordinate system of the imaging unit 5 at the time when the image j was captured is expressed by $P'_{ij} = R_j^T(P_i - t_j)$. $q_{ij}$ is a 2D vector in which coordinates are normalized by the image j of the feature point i. $q_{ij}$ is normalized coordinates of the feature point i in the image j, which can be expressed by (equation 10) below:

$$q_{ij} = \begin{pmatrix} \frac{1}{f}(Q_{ij,x} - a) \\ \frac{1}{f}(Q_{ij,y} - b) \end{pmatrix} \quad \text{(equation 10)}$$

Here, $Q_{ij,x}$ and $Q_{ij,y}$ in (equation 10) are an x coordinate and a y coordinate of coordinates $Q_{ij} = (Q_{ij,x} \times Q_{ij,y})^T$ of the feature point i in the image j. In addition, $p_{ij}(P_i, R_j, t_j)$ is coordinates at which the feature point i at 3D coordinates $P_i$ should appear in the image j captured in the coordinate system indicated by $t_j$ and $R_j$. $p_{ij}(P_i, R_j, t_j)$ can be expressed by (equation 11) below:

$$P_{ij} = \begin{pmatrix} \frac{p_{ij'x}}{p_{ij'z}} \\ \frac{p_{ij'y}}{p_{ij'z}} \end{pmatrix} \quad \text{(equation 11)}$$

($p_{ij'x}$, $p_{ij'y}$, $p_{ij'z}$ are x, y, z coordinates of the feature point i in the coordinate system of the imaging unit 5 which captured the image j)

Note that $q_{ij} - p_{ij}(P_i, R_j, t_j)$ is a difference between the normalized coordinates $q_{ij}$ at which the feature point i on the image j was detected from the image, and the coordinates $p_{ij}(P_i, R_j, t_j)$ of the feature point i on the image when the pose of the image j was $t_j$ and $R_j$. This $q_{ij} - p_{ij}(P_i, R_j, t_j)$ is called "re-projection error". In addition, the function $\rho(\delta)$ of (equation 8) is a function having an error $\delta$ as an argument. As the function $\rho(\delta)$, for example, use can be made of a function of a square error indicated by (equation 12) below, or a loss function of Huber indicated by (equation 13) below. The function $\rho(\delta)$ for calculating the cost C is obtained by performing integration with respect to all feature points i whose coordinates on images were calculated, among all images j with respect to which the pose $R_j$, $t_j$ was calculated.

$$\rho(\delta) = |\delta|^2 \quad \text{(equation 12)}$$

$$\rho(\delta) = \begin{cases} |\delta|^2 & \text{(when } |\delta| < \alpha) \\ 2\alpha|\delta| - |\delta|^2 & \text{(in other cases)} \end{cases}$$

($\alpha$ is a parameter.)

Normally, the cost C is a nonlinear function relating to $P_i$, $R_j$, and $t_j$, and it is difficult to analytically calculate $P_i$, $R_j$, and $t_j$ which minimize the cost C. Accordingly, in the present embodiment, $P_i$, $R_j$, and $t_j$ which minimize the cost C are calculated by a gradient method from the above-described initial values $P_i^0$, $R_j^0$, and $t_j^0$. Here, the gradient method is a method in which, based on update amounts $\Delta P_i^n$, $\Delta R_j^n$, and $\Delta t^n_j$ that are calculated from a variation of the cost C at a time when $P_i$, $R_j$, and $t_j$ are slightly varied from $P_i^n$, $R_j^n$, and $t_j^n$ that are $P_i$, $R_j$, and $t_j$ of an n-th step, $P_i^{n+1}$, $R_j^{n+1}$, and $t_j^{n+1}$ that are $P_i$, $R_j$, and $t_j$ of an (n+1)th step are calculated by $P_i^{n+1} = P_i^n + \Delta P_i^n$, $R_j^{n+1} = R_j^n + \Delta R_j^n$, $t_j^{n+1} = t_j^n + \Delta t_j^n$, respectively, and values to which $P_i$, $R_j$, and $t_j$ converge are set as $P_I^m$, $R_J^m$, and $t_J^m$. There are various gradient methods such as a steepest descent method. In general, in a gradient method at a time of minimizing a large-scale nonlinear function, a Levenberg-Marquardt method is used as a method with a higher speed of convergence.

Since the cost C has a complex shape with respect to $P_i$, $R_j$, and $t_j$, when optimization is not started from initial values which are sufficiently close to true solutions, the processing time until convergence becomes long, or there occurs convergence to erroneous values with large errors. Accordingly, in order to perform 3D reconstruction with high precision, it is necessary to start the process from good initial values. In the present embodiment, when it is judged that the relative pose between two images selected as an image pair cannot uniquely be calculated, the initial values of the bundle adjustment are not calculated by using the relative pose calculated from this image pair. The precision of bundle adjustment can be improved by not calculating the initial values by using such an ambiguous relative pose.

After the bundle adjustment, the 3D image reconstruction processing apparatus outputs a bundle adjustment result. Thereafter, the imaging apparatus 1 stores the bundle adjustment result in the RAM 3, or outputs the bundle adjustment result to the display unit 6.

After the above-described bundle adjustment, the process of FIG. 3 is finished. After the bundle adjustment, 3D coordinates (a 3D shape of the subject) of all points in the image may be calculated by the 3D calculating unit 106. The $P_I^m$, $R_J^m$, and $t_J^m$ obtained as the result of the bundle adjustment are used in the calculation of the 3D coordinates of all points in the image. Then, after the calculation of the 3D coordinates of all points in the image, the restored 3D image of the subject is displayed on the display unit 6, when necessary.

As described above, according to the present embodiment, when it is judged that the relative pose between two images selected as an image pair cannot uniquely be calculated, the calculation of initial values described in step S109 is not performed. Thereby, even when the subject is a plane, the bundle adjustment can be performed in a short time, with high precision.

Modification 1

Figure 7:
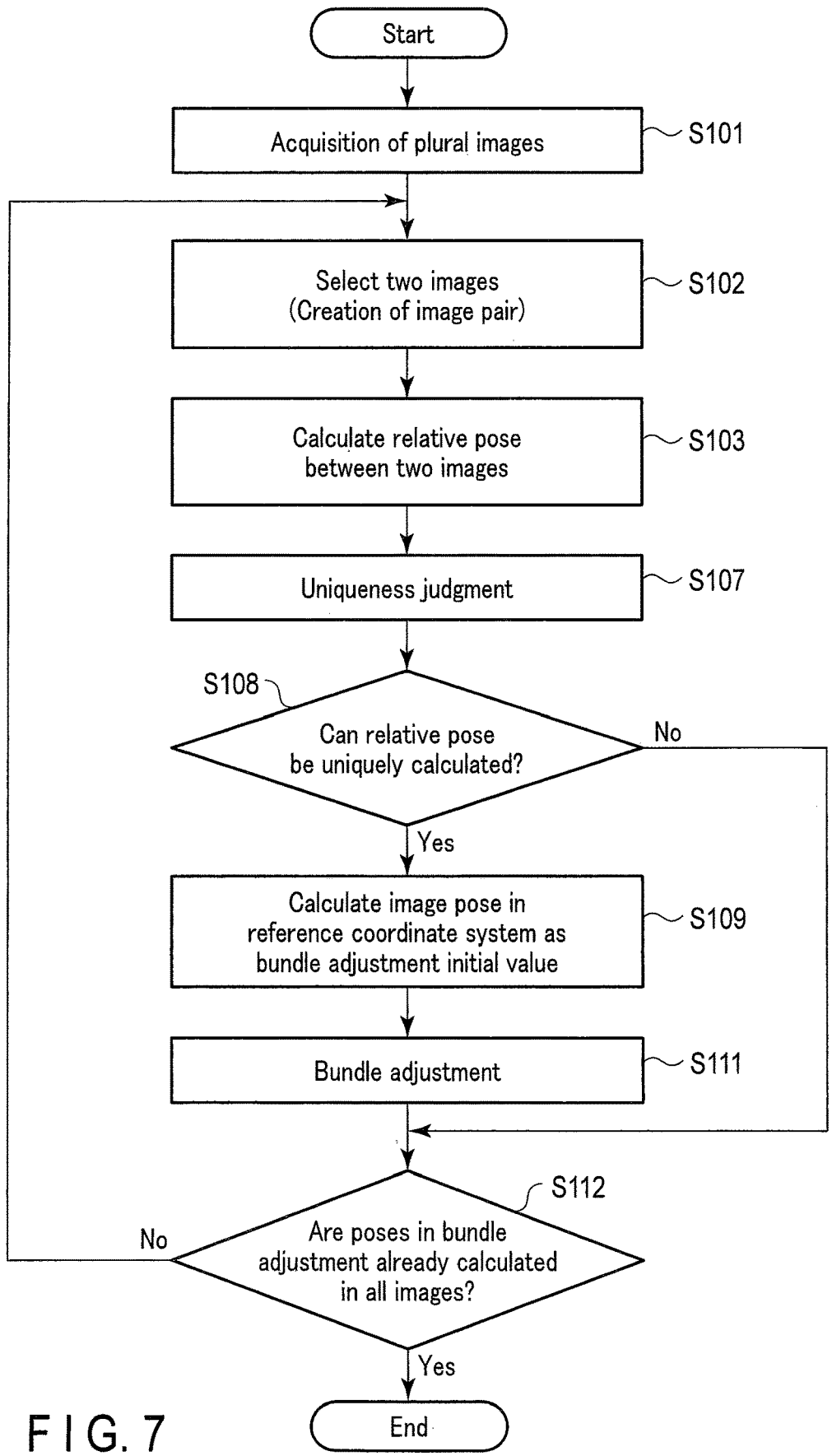
FIG. 7 is a flowchart illustrating an operation of a 3D image reconstruction processing apparatus of Modification 1 of the first embodiment.

Hereinafter, modifications of the first embodiment will be described. FIG. 7 is a flowchart illustrating an operation of a 3D image reconstruction processing apparatus 7 of Modification 1. In the process of FIG. 3, the initial values are calculated each time an image pair is selected. Then, after the initial values for all images, with which the relative pose can uniquely be calculated, are calculated, the bundle adjustment is performed. By contrast, in the modification illustrated in FIG. 7, each time the initial values for a certain image pair are calculated in step S109, the process goes to step S111, and the bundle adjustment is performed by using the initial values of all images, with respect to which the initial values were calculated. Thereafter, the process advances to step S112, and the process is finished when the bundle adjustment is performed by using all images, with respect to which it is judged that the relative pose can uniquely be calculated. Like Modification 1, bundle adjustment may be sequentially performed.

Modification 2

In addition, among all images, image pairs may be selected between one own image and the other images. Among N(N−1)/2 image pairs created for N images, from relative poses of image pairs, with respect to which it is judged that the relative pose can uniquely be calculated, the pose $R_j^0$, $t_j^0$ of each image relative to the reference coordinate system as initial values, and the 3D coordinate $P_i^0$ of the feature point may be calculated.

Modification 3

In the above-described embodiment, in the uniqueness judgment, when it is judged that the relative pose between two images cannot uniquely be calculated, this relative pose is never used in the calculation of initial values. However, it is not always necessary to make all relative poses unavailable.

Modification 4

As described above, there are four solutions for the relative pose between two images. Among the four solutions, the pose calculating unit 102 sets, as an ultimate relative pose, a solution (Solution 1) in which the subject (feature point) is considered to exist in front of the imaging unit 5. However, depending on the configuration of the pose calculating unit 102, the pose calculating unit 102 may calculate two relative poses. When the subject is a plane and the relative pose cannot uniquely be judged, i.e. when all feature points exist in front of the imaging unit 5 with respect to both Solution 1 and Solution 2, if the uniqueness judgment is performed by using the two solutions, it is judged that the relative pose cannot uniquely be calculated, no matter which of relative poses is used. Thus, even when the pose calculating unit 102 calculates the relative poses by the two solutions, i.e. Solution 1 and Solution 2, the uniqueness judgment unit 104 may perform uniqueness judgment by using only one of the relative poses calculated by the pose calculating unit 102.

Second Embodiment

Figure 8:
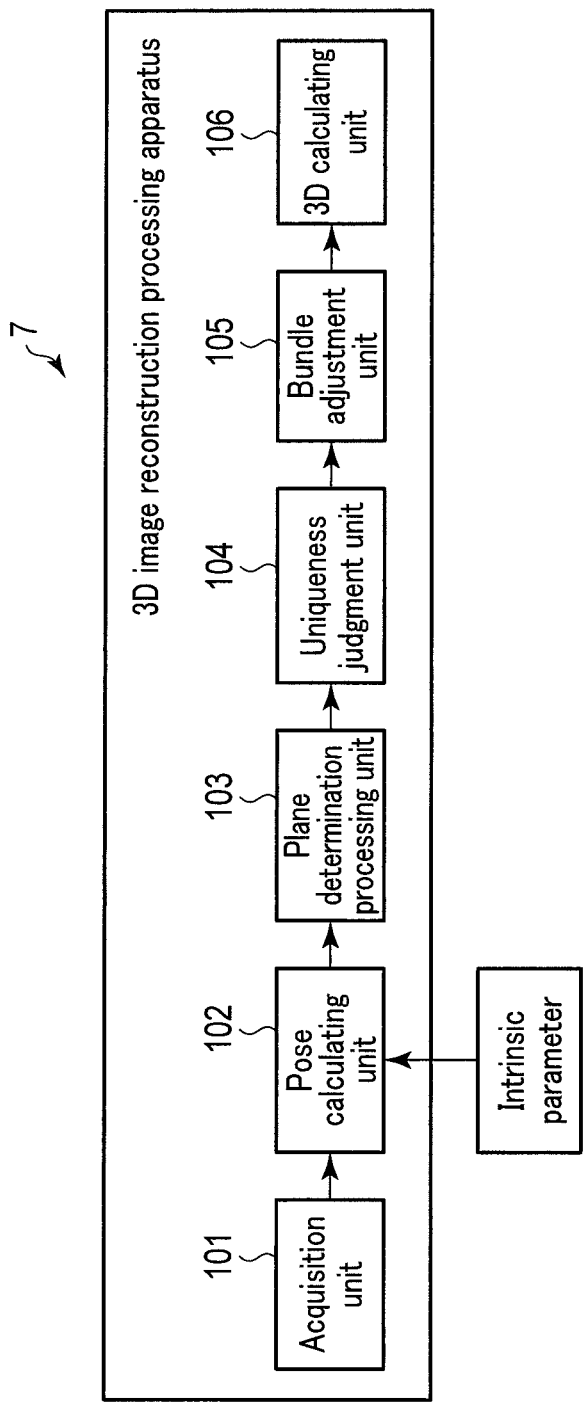
FIG. 8 is a block diagram illustrating a configuration of a 3D image reconstruction processing apparatus in a second embodiment.

Next, a second embodiment of the present invention will be described. FIG. 8 is a block diagram illustrating a configuration of a 3D image reconstruction processing apparatus 7 in the second embodiment. Here, in FIG. 8, the same structural parts as in FIG. 2 are denoted by the same reference signs as in FIG. 2. A description of the structure denoted by the same reference signs is omitted.

The 3D image reconstruction processing apparatus 7 of the second embodiment further includes a plane determination processing unit 103. The plane determination processing unit 103 is provided between the pose calculating unit 102 and uniqueness judgment unit 104, and determines whether the subject is a plane or not. In the first embodiment, the uniqueness judgment is performed based on only the manner of distribution of corresponding feature points between two images, regardless of the shape of the subject. However, when the subject is not a plane, the relative pose can uniquely be calculated regardless of the manner of distribution of corresponding feature points between two images. Thus, in the present embodiment, prior to the uniqueness judgment, it is determined whether the subject is a plane or not, and the uniqueness judgment is performed only when the subject is a plane.

Figure 9:
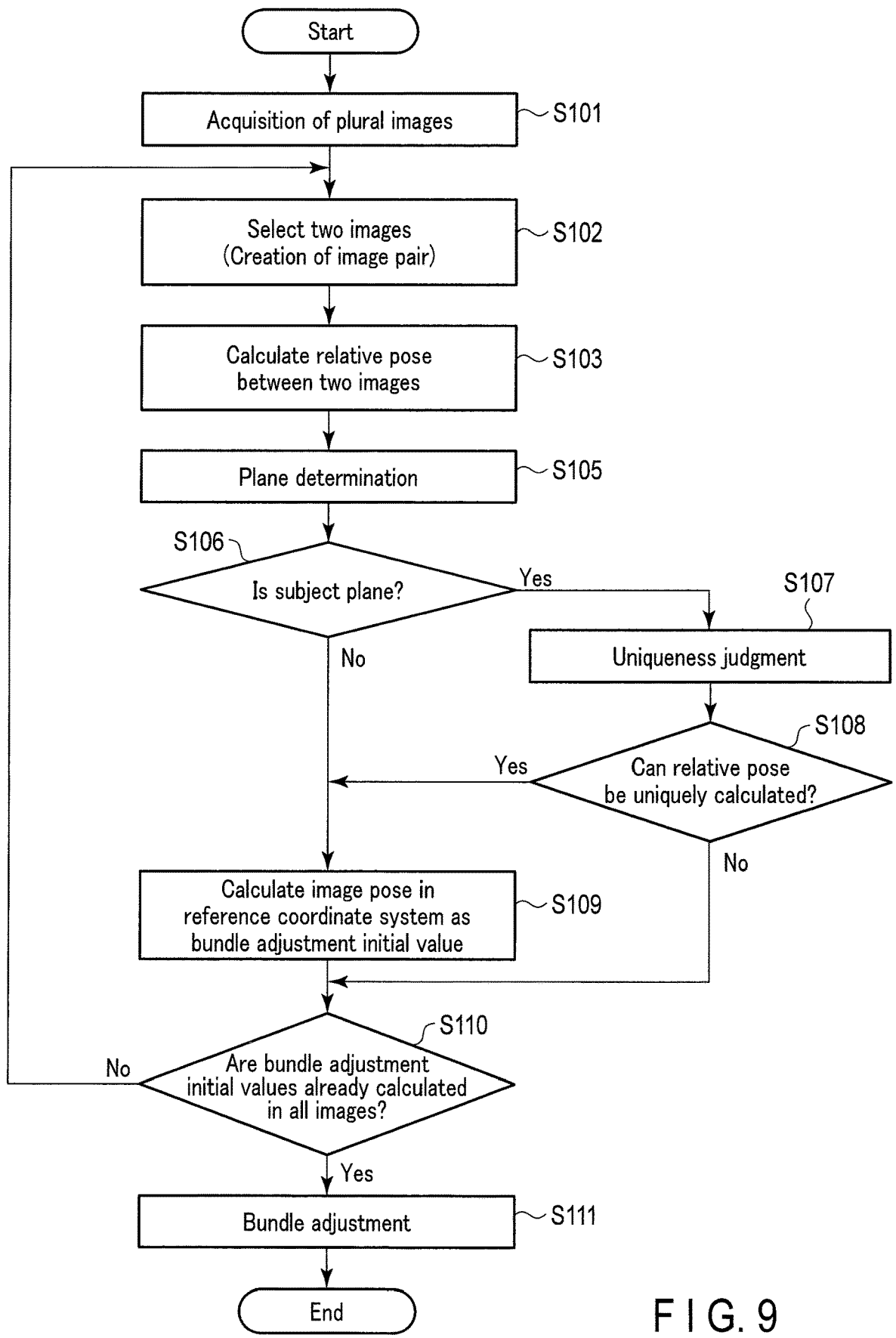
FIG. 9 is a flowchart illustrating an operation of the 3D image reconstruction processing apparatus in the second embodiment.

FIG. 9 is a flowchart illustrating an operation of the 3D image reconstruction processing apparatus 7 in the second embodiment. Here, in FIG. 9, the same process as in FIG. 3 is denoted by the same sign as in FIG. 3. A description of the process denoted by the same sign is omitted. Specifically, in FIG. 9, after the relative pose between two images is calculated in step S103, the process goes to step S105. In step S105, the plane determination processing unit 103 determines whether the subject is a plane or not. For example, the plane determination processing unit 103 determines whether the subject is a plane or not, based on whether the correspondency of coordinates of feature points between two images can be expressed by a relationship of projective transformation. In the case where the subject is a plane, when the coordinates of corresponding feature points between a first image and a second image are 2D vectors, $x'_1=(x'_1 y'_1)^T$, and $x'_2=(x'_2 y'_2)^T$, there exists a 3×3 matrix H which satisfies a condition expressed by (equation 14) below:

$$\begin{pmatrix} x'_2 \\ y'_2 \\ 1 \end{pmatrix} = H \begin{pmatrix} x'_1 \\ y'_1 \\ 1 \end{pmatrix} \quad \text{(equation 14)}$$

Then, a projective transformation matrix H between images is calculated from the coordinates of the corresponding feature points between the first image and second image. A difference between coordinates obtained by transforming the coordinates of the corresponding feature point of the first image by the projective transformation matrix H, and the coordinates of the corresponding feature point of the second image is set as an error of the projective transformation. By comparing this error with a threshold value, it can be determined whether the subject is a plane or not. As the threshold value for determining, from the error of the projective transformation, whether the subject is a plane or not, use can be made of a GRIC (Geometric Robust Information Criterion) value. After this processing, the plane determination processing unit 103 outputs information, which indicates whether the subject is a plane or not, to the uniqueness judgment unit 104. Thereafter, the process advances to step S106.

In step S106, the uniqueness judgment unit 104 determines whether the subject is a plane or not, based on the information from the plane determination processing unit 103. When it is determined in step S106 that the subject is a plane, the process advances to step S107. Thereafter, the same process as in the first embodiment is executed. On the other hand, when it is determined in step S106 that the subject is not a plane, the process advances to step S109. Specifically, the uniqueness judgment is omitted.

As described above, according to the present embodiment, prior to the uniqueness judgment, it is determined whether the subject is a plane or not. Thereby, unnecessary uniqueness judgment can be omitted, and the efficiency of processing is enhanced.

Note that the various modifications described in the first embodiment may be applied to the second embodiment.

Modification 1

Figure 10:
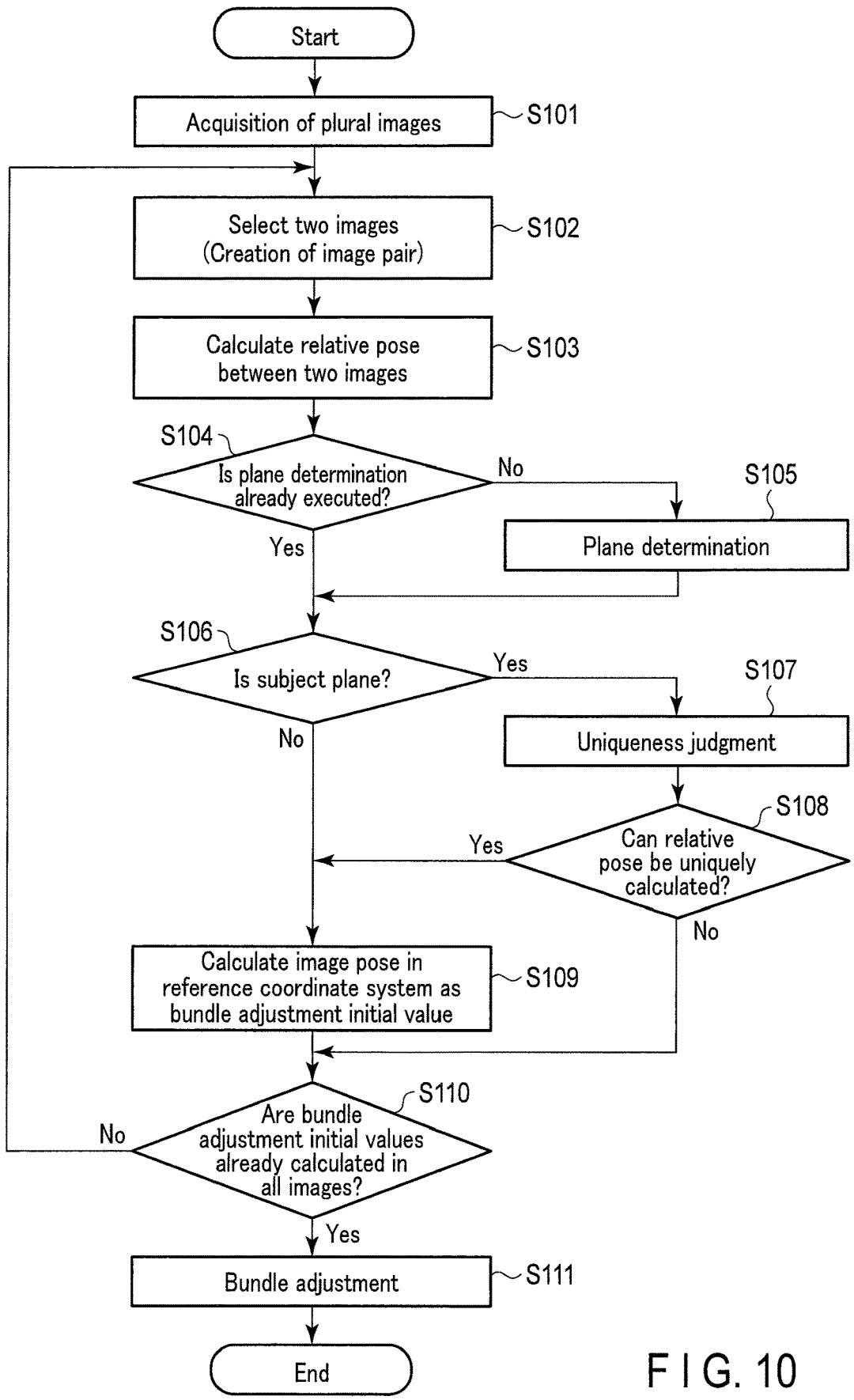
FIG. 10 is a flowchart illustrating an operation of a 3D image reconstruction processing apparatus of Modification 1 of the second embodiment.

Hereinafter, modifications of the second embodiment will be described. FIG. 10 is a flowchart illustrating an operation of a 3D image reconstruction processing apparatus 7 of Modification 1. Modification 1 is a process which is applicable when a plurality of images acquired by the acquisition unit 101 are images or the like obtained by imaging an identical subject so as to have a common view field. In this case, a result of the plane determination with respect to one image pair can be utilized for the plane determination with respect to other image pairs. In short, it should suffice if the plane determination is performed only once.

Accordingly, in Modification 1, after the relative pose between two images is calculated in step S103, the process goes to step S104. In step S104, the plane determination processing unit 103 determines whether the plane determination of the subject has already been executed. Then, the process advances to step S105 only when it is determined in step S104 that the plane determination of the subject has not yet been executed. When it is determined in step S104 that the plane determination of the subject has already been executed, the process of step S105 is skipped.

In this manner, in Modification 1, when the result of the plane determination with respect to one image pair can be utilized for the plane determination with respect to other image pairs, the plane determination is executed only once. Thereby, the efficiency of processing is enhanced.

Modification 2

In the above-described plane determination, it is determined whether the subject is a plane or not, based on whether the correspondency of coordinates of feature points between two images can be expressed by a relationship of projective transformation. However, the method of plane determination is not limited to this. For example, it may be determined whether the subject is a plane or not, based on 3D coordinates of the subject, which are calculated from the relative pose between two images calculated by the pose calculating unit 102.

When the relative pose between two images is already known, the 3D coordinates of the subject can be calculated by, for example, the DLT method. Specifically, a major plane that the subject creates can be found by calculating 3D coordinates for all corresponding feature points with respect to which coordinates are calculated commonly to the two images, and by obtaining planes created by a first principal component vector and a second principal component vector obtained by subjecting 3D coordinates to PCA (principal component analysis). Among all corresponding feature points, when the ratio of feature points, at which the 3D distance of the major plane is a threshold or less, is sufficiently large, it is assumed that all corresponding feature points are on the plane. At this time, the subject is determined to be a plane. Here, the threshold may be determined with reference to the optical center of the optical system that captured the image, and the distance to the subject, or may be determined with reference to an eigenvalue for the first principal component calculated by PCA or an eigenvalue for the second principal component calculated by PCA.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A 3D image reconstruction processing apparatus comprising a processor configured to:
    acquire a plurality of images captured at different viewpoints;
    select two images from the acquired images as an image pair;
    calculate a relative pose between the two images selected as the image pair;
    judge whether or not the relative pose between the two images selected as the image pair is capable of being uniquely calculated;
    determine, based on a result of the judgment, the relative pose which is used in calculating an initial value of bundle adjustment; and
    perform the bundle adjustment, based on the initial value of the bundle adjustment calculated based on the determined relative pose.

2. The 3D image reconstruction processing apparatus of claim 1,
    wherein the processor is configured to determine a relative pose, with respect to which it is judged that the relative pose between the two images is capable of being uniquely calculated, as the relative pose which is used in calculating the initial value of the bundle adjustment.

3. The 3D image reconstruction processing apparatus of claim 1,
    wherein the processor is configured to judge whether the relative pose is capable of being uniquely calculated, by using either one calculated relative pose or two calculated relative poses.

4. The 3D image reconstruction processing apparatus of claim 1,
    wherein the processor is configured to further determine whether a subject is a plane or not, based on the two images which constitute the image pair, and
    wherein the processor is configured to judge whether the relative pose is capable of being uniquely calculated, when the subject is the plane, and configured to judge that the relative pose is capable of being uniquely calculated, when the subject is not the plane.

5. The 3D image reconstruction processing apparatus of claim 4,
    wherein the processor is configured to calculate coordinates of feature points of the two images selected as the image pair, and to determine that the subject is the plane, when a relationship of the coordinates of the feature points in the two images selected as the image pair can be expressed by a relationship of projective transformation.

6. The 3D image reconstruction processing apparatus of claim 4,
    wherein the processor is configured to calculate 3D coordinates of feature points in the two images selected as the image pair, from the relative pose calculated with respect to the image pair, and to determine that the subject is the plane, when the feature points having the calculated 3D coordinates exist on an identical plane.

7. The 3D image reconstruction processing apparatus of claim 1,
wherein the processor is configured to further determine whether a subject is a plane or not, based on the two images selected as the image pair, and
wherein the processor is configured to utilize a determination result of whether the subject is the plane or not, based on the two images selected as the image pair, as a determination result of whether the subject is the plane or not for another image pair.

8. The 3D image reconstruction processing apparatus of claim 7, wherein the processor is configured to calculate coordinates of feature points of the two images selected as the image pair, and to determine that the subject is the plane, when a relationship of the coordinates of the feature points in the two images selected as the image pair can be expressed by a relationship of projective transformation.

9. The 3D image reconstruction processing apparatus of claim 7,
wherein the processor is configured to calculate 3D coordinates of feature points in the two images selected as the image pair, from the relative pose calculated with respect to the image pair, and to determine that the subject is the plane, when the feature points having the calculated 3D coordinates exist on an identical plane.

10. A 3D image reconstruction processing method comprising:
acquiring a plurality of images captured at different viewpoints;
selecting two images from the acquired images as an image pair;
calculating a relative pose between the two images selected as the image pair;
judging whether or not the relative pose between the two images selected as the image pair is capable of being uniquely calculated;
determining, based on a result of the judging, the relative pose which is used in calculating an initial value of bundle adjustment; and
performing the bundle adjustment, based on the initial value of the bundle adjustment calculated based on the determined relative pose.

11. A non-transitory computer-readable storage medium storing a 3D image reconstruction processing program for causing a computer to execute:
acquiring a plurality of images captured at different viewpoints;
selecting two images from the acquired images as an image pair;
calculating a relative pose between the two images selected as the image pair;
judging whether or not the relative pose between the two images selected as the image pair is capable of being uniquely calculated;
determining, based on a result of the judging, the relative pose which is used in calculating an initial value of bundle adjustment; and
performing the bundle adjustment, based on the initial value of the bundle adjustment calculated based on the determined relative pose.

* * * * *